United States Patent [19]  [11] 3,980,457
Smith  [45] Sept. 14, 1976

[54] PNEUMATIC FILTER/SEPARATOR WITH MAGNETICALLY CONTROLLED FLUID VALVE

[75] Inventor: John L. Smith, Cuyahoga Falls, Ohio

[73] Assignee: International Basic Economy Corporation, New York, N.Y.

[22] Filed: Feb. 18, 1975

[21] Appl. No.: 550,215

[52] U.S. Cl. ................................ 55/219; 137/195; 210/313; 251/65
[51] Int. Cl.² ................. B01D 53/00; F16K 31/08
[58] Field of Search .............. 137/429, 195; 251/65; 55/219, 424, 355; 210/123, 313

[56] References Cited
UNITED STATES PATENTS
2,998,825 9/1961 Gleason et al. .................... 137/195
3,233,625 2/1966 Pase ................................. 251/65 X
3,318,323 5/1967 Pearson ............................. 137/195
3,822,933 7/1974 Johnson ............................. 251/65

Primary Examiner—Frank A. Spear, Jr.
Attorney, Agent, or Firm—Price, Heneveld, Huizenga & Cooper

[57] ABSTRACT

A fluid valve apparatus particularly for pneumatic service (air or other gases) in a filter/separator for opening and closing a valve in response to the level of liquid in a container. The apparatus includes a valve having a magnetically attractable portion and a float having a magnet therein adjacent but physically separated from the valve for opening and closing the valve magnetically in response to changes in the liquid level within the container. In the preferred embodiment, the valve apparatus is used with a filter/separator in an air pressure supply line to automatically dump water and other liquids condensed from the air supply and collected in the filter reservoir.

26 Claims, 4 Drawing Figures

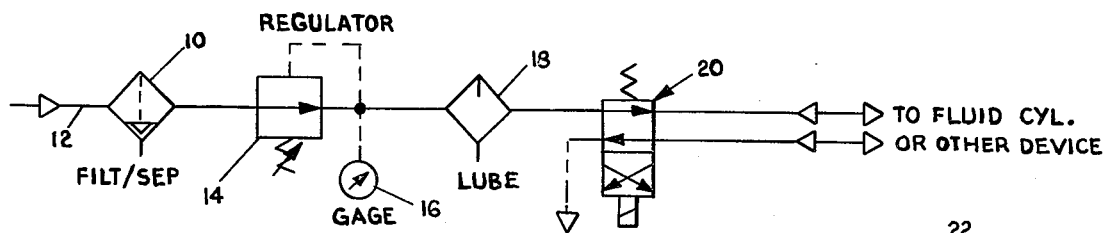
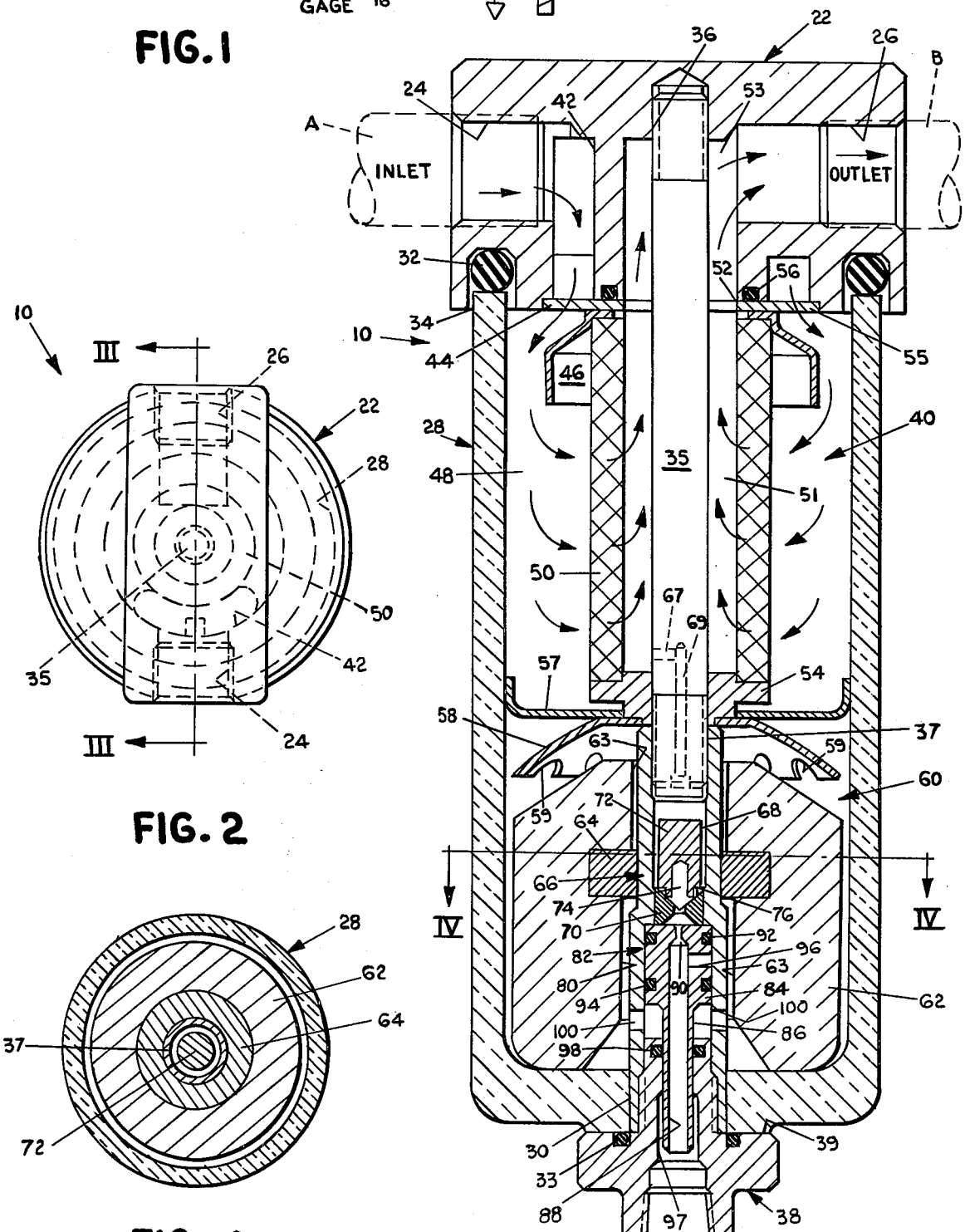

PNEUMATIC FILTER/SEPARATOR WITH MAGNETICALLY CONTROLLED FLUID VALVE

BACKGROUND OF THE INVENTION

This invention relates to fluid valves for pneumatic, and especially air line, filter/separators and the like, such valves being opened and closed in response to physical conditions external of the valve and, more particularly, to a fluid valve which is magnetically operated and opens and closes in response to movement of a magnet which in turn is responsive to changes in a fluid level in an air line filter separator.

Filters and separators for removing foreign objects and condensing and removing water and other liquids from pressurized air lines are well known. Typically, such filters include an air inlet and an air outlet and a filtering element mounted between the inlet and outlet in the air flow path. Such filters also include a reservoir or filter bowl through which the air flow is at least partially passed causing the moisture in the air to be coalesced on the inside surface of the reservoir or bowl. The force of gravity causes such condensed water to accumulate in the bottom of the reservoir. In the past, removal of such water and condensed liquid has been bothersome and time-consuming since it is necessary to periodically open a manually controlled valve in each of the reservoirs or filter bowls to remove the accumulated liquid.

Certain prior known structures have attempted to overcome the above problem by providing automatic valve apparatuses which are mechanically operated and use complicated mechanical elements to remove condensed water and liquids from the reservoir or bowl. The reoccurring problem with such mechanisms is their malfunction due to accumulated dirt and foreign particles which are collected in the reservoir or bowl along with the collected water. Such malfunction necessitates frequent repair, maintenance, or even replacement.

In addition, certain prior known valves have utilized magnets to open and close fluid passageways to control insertion of liquid in a tank or reservoir. However, the present invention for the first time provides a magnetically controlled pneumatic valving system which, in the specific environment of a pneumatic air line, removes liquid and foreign particles and yet prevents malfunctioning due to accumulated dirt or foreign particles. On a broader scale, the invention uses magnetism to control pneumatic valving responsive to a fluid level in a container or reservoir. Thus, the present invention provides a simple, efficient, and reliable answer to such liquid dumping by providing an apparatus which automatically dumps such liquid without human intervention.

SUMMARY OF THE INVENTION

Accordingly, it is an object and purpose of the present invention to provide a filter/separator for pneumatic lines, and especially air supply, lines which filters out and collects foreign material including liquids from the gas or air supply as it passes through the device and includes a valve means which automatically operates to dump collected liquid from a reservoir included in the filter/separator. Generally, the valve portion of the device is magnetically operated and includes a float which moves in response to changes in the liquid level within the reservoir to magnetically open and close a fluid valve in response to that liquid level. Opening of the fluid valve may thereafter cause the opening of a second valve for other operations.

The invention includes a pneumatic or air line filter/separator having a housing including an air inlet and an air outlet. A reservoir means is attached to the housing communicating with the inlet and outlet and having a means for filtering and separating foreign material including liquids from the gas or air as it passes through the inlet into the reservoir means and out of the outlet. The reservoir means includes a collection portion for collecting the liquid separated from the gas or air. Also included is a valve means adapted to prevent the escape of the liquid from the collection portion and for releasing the liquid from the collection portion. The improvement comprises the said valve means including a float and a valve member and cooperating magnet means associated with the float and with the valve member for causing the valve member to be actuated to at least two positions in response to movement of the float. When actuated to one position, the valve member causes the valve means to release the liquid from the collecting chamber. When actuated to the other position, the valve means prevent the escape of liquid and gas or air from the collection portion. Accordingly, the device automatically dumps collected liquid from the reservoir.

In other aspects of the invention, gas pressure may be supplied to urge the valve member to a normally closed position causing the magnet and float to open the valve member against pressure of the gas. Also, a second valve may be included in the valve means to operate in response to opening of the first valve member by the float and magnet. When no liquid is present, the magnet means in the float is positioned to magnetically urge the first valve member to its closed position.

Accordingly, the present invention provides an apparatus for automatic dumping of liquid when the liquid has reached a predetermined level. Although especially adapted for use in such an air line filter/separator, the apparatus is also well-adapted for use as an air pilot, two-way valve controlled by a permanent magnet in response to a liquid level external of the valve in a predetermined location. Thus, the apparatus may be used as a pneumatic or media pilot for other valves in a liquid level control system. Further, it may be used as a pilot valve, quasipneumatic logic element, proximity sensor, or the like wherein liquid levels are monitored and valves are controlled in response to such liquid levels.

These and other objects, advantages, purposes, and features of the invention will become more apparent from a study of the following description taken in conjunction with the drawings.

BRIEF DESCRIPTION OF THE DRAWINGS

FIG. 1 is a schematic illustration of the typical location and environment for the preferred embodiment of the present invention in an air pressure line supplying air for operating a fluid cylinder or other fluid device;

FIG. 2 is a top view of the air pressure line filter/separator including the present invention;

FIG. 3 is a sectional view of the filter/separator taken along plane III—III of FIG. 2; and FIG. 4 is a sectional view of the invention taken along plane IV—IV of FIG. 3.

DESCRIPTION OF THE PREFERRED EMBODIMENT

Referring now to the drawings in greater detail, FIG. 1 illustrates schematically the location of a filter/-separator 10 for removing water and other liquids from an air pressure supply line 12. The filter 10 is positioned upstream of a pressure regulator 14, a pressure gauge 16, and a lubricator 18. Following the lubricator, which injects a predetermined amount of oil into the air supply to aid operation of the fluid-operated device or devices, the air pressure line leads to a fluid cylinder or other fluid-operated device 20 as shown in FIG. 1. The fluid regulator, pressure gauge, lubricator, and fluid cylinder or other device are all conventionally known, commercially available items. The filter/separator 10 of the present invention collects water condensed from the air supply until the liquid reaches a predetermined level when the valve apparatus of the present invention automatically dumps the same from the filter.

Referring now to FIGS. 2–4, the preferred embodiment of the filter/separator 10 includes a top or upper housing 22 having an air pressure supply inlet 24 and an air outlet 26. The inlet and outlet are adapted to receive air pressure lines or pipes A and B, respectively, as shown in FIG. 3. Extending downwardly from housing 22 is an elongated, right circular cylindrical filter reservoir or bowl 28. Bowl 28 is preferably formed from transparent, high strength plastic and has a bottom opening or aperture 30 through which a portion of the valve apparatus is inserted. As seen in FIG. 3, bowl 28 houses and supports filtering apparatus 40 in its upper portion and the magnetically operated valve apparatus 60 in its lower portion.

An annular, O-type, sealing ring 32 of rubber or the like is inserted in a recess 34 in housing 22 for sealing the upper edge of the bowl or reservoir 28 within the housing. Reservoir 28 is secured against the "O" ring 32 and housing 22 by means of an elongated, cylindrical, tie rod 36 secured between a threaded aperture 36 in housing 22 and the threaded, upper, inside diameter of an upstanding conduit 37. Conduit 37 forms a portion of the valve apparatus of the present invention and extends through aperture 30 in the bottom of reservoir 28. A removable, threaded member 38 having an annular shoulder surface 39 bearing against the bottom of the reservoir 28 is secured in the lower portion of the conduit 37 via threads provided in the inside diameter thereof. An O-type sealing ring 33 in surface 39 seals member 38 against the bottom of bowl 28. As will be seen from FIG. 3, tie rod 36 extends through filter apparatus 40 while conduit 37 extends through and provides a portion of magnetically operated valve apparatus 60.

As is best seen in FIGS. 2 and 3, air from pipe A and inlet 24 passes through an arcuate fluid chamber 42 on the inlet side of housing 22, downwardly through a perforated, generally flat, baffle plate 44, around an inverted, cupshaped hood baffle 46, and into the filter chamber area 48 comprising the upper portion of filter reservoir 28. Thereafter, the air passes through a right, circular, cylindrical, porous filter element 50 into a filtered air chamber 51 on the inside of the filter element 50, upwardly through an aperture 52 in baffle plate 44, into an outlet chamber 53, and through outlet port 26. Filter 50, which is preferably formed from bonded cellulose or powdered metal, filters out dust, dirt, and other foreign particles in the air. Filter 50 is supported centrally within filter chamber area 48 by means of the end surface of conduit 37 bearing against the underside of a washer-like support element 54 engaging the bottom end of filter 50 and holding filter 50 against the inside surface of hood baffle 46 which in turn is held against baffle plate 44. Baffle plate 44 is in turn held within annular recess 55 and an O-type sealing ring 56 on two internal shoulders of housing 22 on the underside thereof. The upper end of conduit 37 also supports an annular screen or strainer element 57 extending between the washer-like member 54 and the internal sides of the filter reservoir 28. Strainer 57 has a generally U-shaped cross section and prevents dirt and other foreign particles from dropping down under the force of gravity into the lower chamber. An inverted, dome-like filter baffle 58 extends into the lower portion of the reservoir where the magnetically operated valve apparatus 60 is located. Filter baffle 58 includes a plurality of semicircular slots 59 allowing passage of liquid to the reservoir bottom and prevents the turbulence present in the upper portion of reservoir 28 from entering the lower portion of the reservoir.

Accordingly, the filtering apparatus 40 provides a continuous supply of filtered air passing from inlet 24 through filter 50 and outlet port 26 in the manner described above. The passage of the flow of air (see arrows in FIG. 3) through the upper portion of the filter reservoir or bowl 28 also causes the moisture present within the air supply being filtered to coalesce and to impinge on or condense along the sides of the interior of the reservoir. Such condensed water and other liquid is drawn downwardly by the force of gravity and collects in the bottom of the reservoir. When such liquid collects to a predetermined level, the liquid operates the magnetically operated valve apparatus 60 to dump or release that quantity of liquid through the valving which is more fully explained hereinafter.

As is best seen in FIGS. 3 and 4, the upstanding conduit 37 extends upwardly through aperture 30 in the bottom of reservoir 28 through the central aperture 63 of an annular, cylindrical float 62 formed from closed-cell urethane foam. Float 62 is preferably formed from closed-cell urethane because such material resists deformation and collapse due to pressure within the float chamber. However, other materials may also be used as long as they retain their shape under the typical pressure encountered in this system while providing the necessary buoyancy and lift. Approximately centrally located within the float is an annular, permanent magnet 64 of the ceramic molded with iron particles type fitted in a recess on the inside of flat 62 such that it extends slightly beyond the wall of aperture 63.

Below the end of tie rod 35 to which conduit 37 is threaded, is a poppet valve assembly 66 including a poppet valve member 68 and a valve seat 70. Filtered, pressurized air is admitted from chamber 51 to the upper end of conduit 37 and valve assembly 66 through passageways 67 and 69 in tie rod 35. Valve member 68 is movable axially within conduit 37 and includes an upper body portion 72 formed from a magnetically attractable material such as steel or stainless steel. Body 72 has a cross-sectional area and diameter slightly less than the inside diameter of the upper portion of conduit 37. Hence, as is illustrated in FIG. 3, a slight space exists between valve member 68 and the inside of conduit 37 and allows the member to move axially away from and toward valve seat 70. Valve member 68 also includes a tapered or pointed, flexible, resilient, valve seat closure or engaging member 74 formed from rubber, plastic, or the like. Member 74 extends downwardly and outwardly of the body 72 for engaging the V-shaped, tapered upper surface 76 of valve seat 70. Immediately below valve 66 in the lower portion of conduit 37 is a piston valve assembly 80. Piston valve 80 includes an elongated piston valve member 82 with an upper cylindrical body portion 84 having a size approximating the inside diameter of the lower portion of conduit 37. An integral cylindrical extension 86 extends downwardly from the bottom end of upper portion 84. A fluid passageway 88 extends the length of valve member 82 and includes a constricted or necked-down upper portion 90 as shown in FIG. 3. A pair of vertically spaced, O-type sealing rings 92 and 94 engage the inner diameter of conduit 37 and provide a seal above and below a second fluid passageway 96 providing fluid communication between the interior of conduit 37 and fluid passageway 88 through the side of body portion 84. Cylindrical extension 86 on the bottom of valve member 82 has a diameter less than that of the body portion 84 and extends downwardly through a central aperture 97 in threaded member 38. O-type sealing ring 98 provides a seal between extension 86 and aperture 97. Seal 98 prevents the escape of either air pressure or liquid unless the valve member 82 is in its open position.

Fluid communication between the interior of the bottom portion of reservoir 28 and the interior of the lower portion of conduit 37 is provided by one or more conduit apertures 100 extending through the conduit walls generally perpendicularly to the longitudinal axis thereof as shown in FIG. 3. When fluid valve 82 is in the position shown in FIG. 3, O-rings 92 and 94 prevent the liquid from the inside of reservoir 28 from passing into fluid passageways 96 and 88 and out to the atmosphere. However, when valve 68 is open, air pressure entering from air passageways 67 and 69 in tie rod 35 and around valve member 68 acts against the top surface of valve member 82 to move that member downwardly such that fluid passageway 96 is in registry with at least one of the fluid apertures 100 in conduit 37. Thus, when fluid member 82 is open, a fluid passageway to the exterior of the reservoir is provided allowing the liquid therein to be automatically released or dumped.

OPERATION

Referring to FIGS. 2–4, the operation of the present magnetically operated valve apparatus 60 in conjunction with the filter/separator for an air pressure supply line will be more fully understood. Air pressure of between approximately 20 and 200 psi is supplied to filter inlet 24 causing the interior of reservoir 28 to become pressurized. Air flow through the filter element is caused only when air is used downstream from the filter/separator 10 in a fluid cylinder 20 or other device as shown in FIG. 1. With no flow and no liquid or condensed moisture present within the interior bottom of reservoir 28, poppet valve 68 is held closed such that tapered member 74 engages surface 76 of valve seat 70 to prevent air pressure from flowing through the valve seat. With no air pressure being applied against the top of valve 82, air pressure enters the interior of conduit 37 through apertures 100 and acts against the underside of body portion 84 of piston valve 82. Valve 82 is forced upwardly and held in its closed position as shown in FIG. 3.

Poppet valve 68 is held in its closed position by the combined forces of the greater force resulting from the difference in air pressure acting against its top surface than against the seating surface via passageways 67 and 69 as well as by the magnetic force of magnets 64 attracting body portion 72 downwardly when no liquid is present within the reservoir. When no liquid is present, magnet 64 is positioned at least partially below the end of portion 72 as shown in FIG. 3. When both valves 66 and 80 are in their closed positions as shown in FIG. 3, O-ring 94 prevents the escape of air pressure to the atmosphere and no additional return spring or other biasing means is required to hold the piston valve 82 in its closed position.

As air pressure from the air line 12 is used downstream from the filter by the fluid cylinder 20 or another device, a flow through the filter/separator 10 is established. Moisture in the air supply is condensed on the inside surface of the reservoir 28. The condensed water and other liquids drain to the bottom of the reservoir through strainer 57 which removes and retains line scale and other foreign objects which might obstruct operation of the valve apparatus 60. As the amount of condensed water and other liquids build up within the reservoir 28, the urethane float 62 begins to rise axially along the exterior of conduit 37 as guided by the engagement of magnet 64 with the exterior diameter of conduit 37. The density of the closed cell, urethane material from which float 62 is formed is chosen to be less than the density of the condensed liquid which is mainly water. Accordingly, the float will easily float in the condensed liquid even though traces of other, more dense liquids may be included. Upward movement of magnet 64 simultaneously attracts and correspondingly lifts poppet valve member 68. As the liquid reaches a predetermined level, the float and magnet lift poppet valve member 68 off seat 70 such that member 74 no longer engages surface 76 for closing the aperture therethrough.

The strength of magnet 64 is sufficient to lift poppet valve 68 off seat 70 against the force of the air pressure acting against the top of valve 68 which is slightly smaller than the inside diameter of conduit 37. Once the poppet valve 68 is opened, air pressure is equalized at all parts therearound, both on top and beneath it, thereby requiring less force to maintain it in its opened position than is necessary to lift it from its valve seat 70 against the air pressure. Accordingly, the strength of permanent magnet 64 is determined by the mass of poppet valve 68 and the resultant force of air pressure acting thereagainst. Once valve assembly 66 is opened, filtered air pressure from passageways 67 and 69 is admitted through tie rod 35, around valve member 68, through valve seat 70, and against the top of piston valve 82. Piston valve 82 is moved downwardly because the force resulting from the air pressure against its larger top surface is greater than that resulting from the air pressure acting against its bottom surface. Passageway 96 is brought into registry with apertures 100 in conduit 37 and the buildup or volume of liquid in the bottom of reservoir 28 is allowed to escape to the atmosphere through conduit 100 and passageways 96 and 88. The pressure of the air within the reservoir 28 helps propel and force the liquid out through the passageways.

As the liquid level decreases in the filter bowl, float 62, magnet 64, and poppet valve 68 move downwardly together. As member 74 engages and closes off valve seat 70, air pressure is sealed off from the top of piston valve member 82. Any retained or trapped pressure between valve seat 70 and the top of member 82 is vented to atmosphere through the constricted or narrowed portion 90 of passageway 88. Thereafter, air pressure acting against the bottom of body 84 of piston valve 82 pushes the valve 82 axially upwardly to its closed position as shown in FIG. 3. The size of the necked-down or constricted portion 90 of passageway 88 governs the speed at which the trapped air pressure is released to the atmosphere and thus governs the speed at which the air pressure within the reservoir returns the piston valve member to its closed position. If the aperture 90 is large, the piston valve will snap back to closed position very quickly and vice versa.

As will be appreciated, the concept of a float including a magnet for lifting poppet valve member 68 off its seat to open the same upon the buildup of liquid to a predetermined level may be used to control other valves and operations besides the liquid release or dump valve comprising piston valve assembly 80 in the preferred embodiment. As such, the magnetically operated valve apparatus 60 may have other applications such as in pilot valves, liquid level control valves, and the like.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A pneumatic filter/separator having a housing with a gas inlet and a gas outlet; a reservoir means attached to said housing and communicating with said inlet and outlet and having means for filtering and separating foreign material including liquids from said gas as it passes through said reservoir means and out of said outlet; said reservoir including a collection portion for collecting said liquid separated from said gas; and a valve means adapted for preventing the escape of said liquid from said collection portion and releasing said liquid from said collection portion, the improvement comprising:

said valve means including a float, a first valve member, and second, gas-actuated valve means responsive to acutation of said first valve member for releasing the liquid from said reservoir means; cooperating magnet means associated with said float and with said first valve member for causing said first valve member to be actuated to at least two positions in response to movement of said float to admit gas to said second valve means; said filtering and separating means including means for supplying filtered gas to said first valve member and said second valve means; said first valve member when actuated to one position causing filtered gas to actuate said second valve means for a closed to an open position to release said liquid from said collection chamber, and when actuated to another position, closing off filtered gas to said second valve means allowing said second valve means to return to its closed position to prevent escape of said liquid from said collection portion whereby said filter/separator automatically dumps collected liquid from said reservoir.

2. The filter/separator of claim 1 including means for providing an opening to the exterior of said reservoir means; and means for mounting said second valve means to open and close said opening to the exterior when said first valve member is in said one and other positions, respectively, in response to changes in position of said float caused by changes in liquid level within said reservoir means.

3. The filter/separator of claim 1 including a conduit mounted within said collecting portion of said reservoir means and extending out of said collecting portion to the exterior thereof to provide a fluid path for releasing liquid collected in said collecting portion; means for mounting said first valve member and second valve means in said conduit to open and close said conduit in said one and other positions, respectively; said magnet means attracting and moving said first valve member between said positions without direct physical contact between said first valve member and magnet means in response to changes in position of said float caused by changes in liquid level within said reservoir means.

4. The filter/separator of claim 3 wherein said float is generally annular and includes an aperture extending axially therethrough; said conduit being cylindrical in shape and extending upwardly through said float aperture.

5. The filter/separator of claim 4 wherein said first valve member is located within said conduit, said conduit also including a valve seat within said conduit below said first valve member such that said first valve member closes said conduit when it engages said valve seat; said magnet means including a permanent magnet mounted in said float and having a generally annular shape and surrounding and generally matching the exterior cross-sectional shape of said conduit; said collecting portion having a bottom, said magnet being located in said float such that when no liquid is in said collecting portion and said float rests on the bottom of said collecting portion, at least a portion of said magnet is below the position of said first valve member when it engages said valve seat to magnetically urge said valve member to a closed position.

6. The filter/separator of claim 3 wherein said means for supplying filtered gas include means for supplying filtered gas pressure to the end of said conduit within said reservoir means; said magnet means attracting and moving said first valve member against the pressure of said gas by magnetic force without direct physical contact between said valve member and magnet.

7. The filter/separator of claim 6 wherein said conduit includes a wall, said wall including an aperture extending therethrough within said reservoir means, said conduit including said second valve means below said first valve member; said second valve means having a movable second valve member and means for sealing said conduit around said conduit aperture whereby when said valve member is open, said second valve member is moved by the pressure of said gas to release the liquid from said collecting portion through said conduit aperture.

8. The filter/separator of claim 7 wherein said second valve member includes a first fluid passageway extending therethrough into fluid communication with the portion of said conduit extending out of said reservoir means, and a second fluid passageway for providing fluid communication between said conduit aperture and said first fluid passageway whereby when said second valve member is moved, said second fluid passageway is brought into fluid communication with said conduit aperture to release the liquid through said passageways.

9. The filter/separator of claim 8 wherein said conduit is elongated and has an axis; said second valve member having an axis of movement within said conduit and parallel to said conduit axis, said second passageway extending through a side of said second valve member while said first passageway extends generally parallel to said axis of movement thereof, said sealing means including a pair of sealing gaskets spaced apart along said second valve member on either side of said second fluid passageway to provide a fluid seal between said second valve member and the inside surface of said conduit; and a third sealing means below said conduit aperture and said pair of sealing gaskets for preventing release of the liquid when the first valve member closes said conduit.

10. The filter/separator of claim 9 wherein the upper portion of said first fluid passageway in said second valve member communicates with the interior of said conduit between said first valve member and second valve means to relieve pressure therebetween and allow closing of said second valve member and has a cross-sectional area less than the remainder of that passageway.

11. The filter/separator of claim 7 including a removable member in said portion of said conduit extending out of said reservoir means, said removable member having a passageway therethrough providing an exit to the exterior of said reservoir means and receiving a portion of said second valve member for movement therein; second sealing means for sealing said portion of said second valve member within said passageway in said removable member and third sealing means for sealing said removable member against said reservoir means.

12. The filter/separator of claim 7 including second sealing means for preventing release of the liquid from said collecting portion through said conduit aperture when said second valve member is in its closed position.

13. The filter/separator of claim 3 wherein said first valve member is located within said conduit and includes an annular valve seat within said conduit forming a constricted opening therewithin; said first valve member including a body having a cross-sectional area less than that of the interior of said conduit and a flexible, resilient sealing member extending from one end of said body for engaging and closing said valve seat.

14. The filter/separator of claim 3 including means for securing said reservoir means to said housing with said valve means secured below said filtering means within said reservoir means such that said float is adjacent the bottom of said reservoir means within said collecting portion.

15. The filter/separator of claim 14 wherein said means for securing said reservoir means to said housing with said valve means secured below said filtering means includes a tie rod threadedly secured between the upper portion of said conduit and said housing and a member threadedly secured to the lower end of said conduit for holding said reservoir means against said housing.

16. The filter/separator of claim 15 wherein said float is generally annular and includes an aperture extending axially therethrough; said conduit being cylindrical in shape and extending upwardly through said float aperture; said conduit providing a generally vertical guide for guiding movement of said float.

17. Valve apparatus for opening and closing a fluid valve in response to the level of a liquid in a container, said liquid having a predetermined density, said apparatus comprising:
a conduit;
first valve means for opening and closing said conduit, said valve means including a first valve member movably mounted to open and close said conduit and having a portion formed from magnetically attractable material;
pressure means for admitting a gas under pressure to one end of said conduit;
float means mounted for movement within a container in response to the liquid level therein, adapted to float in said liquid, having a density less than that of the liquid, and having a magnet for attracting and moving said first valve member by magnetic force without direct physical contact between said first valve member and float means to open and close said conduit to admit gas pressure from said pressure means within said conduit as said liquid level changes within the container; and second valve means within said conduit for opening and closing said conduit, said second valve means being movable between open and closed positions in response to the presence or absence of gas pressure within said conduit as controlled by said first valve means.

18. The valve apparatus of claim 17 wherein said pressure means include means for supplying gas at a predetermined pressure to the end of said conduit on the side of said first valve means opposite said second valve means, said conduit being adapted to allow gas to flow therethrough when said valve is opened; said first valve member being normally urged closed by the pressure of said gas, said magnet moving said first valve member against said gas pressure to open said conduit.

19. The valve apparatus of claim 18 wherein said float means includes a generally annular float with an aperture extending therethrough; said conduit being cylindrical in shape and extending upwardly through said float aperture.

20. The fluid apparatus of claim 19 wherein said first valve means is located within said conduit and includes a valve seat below said first valve member such that said first valve means closes said conduit when said first valve member engages said valve seat; said magnet in said float being a permanent magnet, being generally annular and surrounding and generally matching the exterior cross-sectional shape of said conduit; and located in said float such that when no liquid is in the container and said float is resting on the bottom of the container, at least a portion of said magnet is below the position of said magnetically attractable portion of said first valve member when it engages said valve seat to magnetically urge said first valve means closed.

21. The valve apparatus of claim 18 wherein said conduit is mounted within the container, extends out of the container, and includes an aperture extending through one wall thereof; said second valve means having a movable second valve member and means for sealing said conduit around said conduit aperture whereby when said first valve means is opened, said second valve member is moved by said gas pressure to release the liquid from the container through said conduit aperture.

22. The valve apparatus of claim 21 wherein said second valve member includes a first fluid passageway extending therethrough into fluid communication with said conduit portion extending out of said container, and a second fluid passageway for providing fluid communication between said conduit aperture and said first fluid passageway whereby when said valve member is moved, said second fluid passageway is brought into fluid communication with said conduit aperture to release the liquid through said passageways.

23. The valve apparatus of claim 22 wherein said conduit is elongated and has an axis; said second valve member having an axis of movement within said conduit parallel to said conduit axis, said second passageway extending through a side of said second member while said first passageway extends generally parallel to said axis of movement thereof, said sealing means including a pair of sealing gaskets spaced apart along said second member on either side of said second passageway providing a fluid seal between said second valve member and the inside surface of said conduit; and a third sealing means below said conduit aperture and said pair of sealing gaskets for preventing release of the liquid when said first valve means closes said conduit.

24. The valve apparatus of claim 21 including a removable member in said portion of said conduit extending out of said container, said removable member having a passageway therethrough providing an exit to the exterior of said container and receiving a portion of said second valve member for movement therein, second sealing means for sealing said portion of said second valve member within said passageway in said removable member and third sealing means for sealing said removable member against said container.

25. The valve apparatus of claim 21 in combination with a filter/separator for removing water and other liquid condensates from an air pressure line, said separator including a container comprising a reservoir for said separator, a housing having an air inlet and an air outlet, means for filtering air as it passes between said outlets, and means for securing said container to said housing with said valve apparatus secured below said filtering means within said reservoir such that said float means is adjacent the bottom of said reservoir.

26. The valve apparatus of claim 18 wherein said first valve means is located within said conduit and includes an annular valve seat within said conduit forming a constricted opening within said conduit; said first valve member including a body having a cross-sectional area less than that of the interior of said conduit and forming said magnetically attractable portion thereof and a flexible, resilient sealing member extending from one end of said body for engaging and closing said valve seat.

* * * * *

UNITED STATES PATENT OFFICE
CERTIFICATE OF CORRECTION

Patent No. 3,980,457      Dated September 14, 1976

Inventor(s) John L. Smith

It is certified that error appears in the above-identified patent and that said Letters Patent are hereby corrected as shown below:

Column 7, line 60, "for" should be -- from --.

Signed and Sealed this

Eighteenth Day of July 1978

[SEAL]

Attest:

RUTH C. MASON
*Attesting Officer*

DONALD W. BANNER
*Commissioner of Patents and Trademarks*